United States Patent
Fink et al.

(10) Patent No.: US 10,174,494 B2
(45) Date of Patent: Jan. 8, 2019

(54) WATER TREATMENT APPARATUS

(71) Applicant: Hydro International plc, Clevedon (GB)

(72) Inventors: Jeremy Fink, Portland, ME (US); Lisa Lemont, New Gloucester, ME (US)

(73) Assignee: Hydro International Ltd, Clevedon (GB)

( * ) Notice: Subject to any disclaimer, the term of this patent is extended or adjusted under 35 U.S.C. 154(b) by 0 days.

(21) Appl. No.: 15/379,223

(22) Filed: Dec. 14, 2016

(65) Prior Publication Data

US 2017/0254062 A1 Sep. 7, 2017

Related U.S. Application Data

(60) Provisional application No. 62/303,127, filed on Mar. 3, 2016.

(51) Int. Cl.
| | |
|---|---|
| *E03F 5/04* | (2006.01) |
| *C02F 3/32* | (2006.01) |
| *A01G 9/033* | (2018.01) |
| *A01G 24/00* | (2018.01) |
| *A01G 9/02* | (2018.01) |

(Continued)

(52) U.S. Cl.
CPC .............. *E03F 5/0404* (2013.01); *A01G 9/02* (2013.01); *A01G 9/033* (2018.02); *A01G 24/00* (2018.02); *A01G 27/008* (2013.01); *B01D 24/007* (2013.01); *B01D 24/02* (2013.01); *B01D 35/02* (2013.01); *C02F 1/001* (2013.01);

(Continued)

(58) Field of Classification Search
CPC ........ E03F 5/0404; E03F 5/14; B01D 24/007; B01D 24/02; B01D 24/045; B01D 35/02; C02F 3/327; C02F 2103/001
USPC .......................... 210/170.03, 283, 602, 747.3
See application file for complete search history.

(56) References Cited

U.S. PATENT DOCUMENTS 5,322,629 A * 6/1994 Stewart ..................... E03F 1/00
210/170.03
5,707,527 A * 1/1998 Knutson ................... E03F 5/14
210/170.03

(Continued)

FOREIGN PATENT DOCUMENTS

| KR | 101081568 B1 | 11/2011 |
|---|---|---|
| KR | 101343005 B1 | 12/2013 |
| WO | 2017027644 A1 † | 2/2017 |

OTHER PUBLICATIONS

UK Search Report dated Sep. 30, 2016 for Application No. GB1606399.2.

*Primary Examiner* — Christopher Upton
(74) *Attorney, Agent, or Firm* — Honigman Miller Schwartz and Cohn LLP

(57) ABSTRACT

There is disclosed a water treatment apparatus for treating stormwater, the water treatment apparatus comprising a volume of filter media, a baffle and an inlet conduit. The baffle extends upwards from the volume of filter media and defines a pre-treatment zone on one side of the baffle and a treatment zone on an opposing side of the baffle. The inlet conduit opens into the pre-treatment zone and is separated from the treatment zone by the baffle. The baffle is configured to regulate a flow of stormwater received via the inlet conduit by controlling the passage of stormwater from the pre-treatment zone to the treatment zone.

22 Claims, 7 Drawing Sheets

(51) Int. Cl.
  *A01G 27/00* (2006.01)
  *B01D 24/00* (2006.01)
  *B01D 24/02* (2006.01)
  *B01D 35/02* (2006.01)
  *C02F 1/00* (2006.01)
  *C02F 103/00* (2006.01)

(52) U.S. Cl.
  CPC .............. *C02F 1/004* (2013.01); *C02F 3/327* (2013.01); *C02F 2103/001* (2013.01); *C02F 2307/00* (2013.01)

(56) References Cited

U.S. PATENT DOCUMENTS

| | | | |
|---|---|---|---|
| 8,333,885 B1 † | 12/2012 | Iorio | |
| 2007/0256966 A1* | 11/2007 | Siviter | E03F 5/12 210/170.03 |
| 2010/0206790 A1* | 8/2010 | Holtz | E03F 5/14 210/170.03 |
| 2011/0186492 A1* | 8/2011 | Holtz | C02F 1/00 210/170.03 |
| 2012/0091057 A1* | 4/2012 | Kent | C02F 3/327 210/602 |
| 2013/0140229 A1 | 6/2013 | Allen et al. | |
| 2016/0176732 A1* | 6/2016 | Holtz | C02F 3/327 210/170.03 |

\* cited by examiner
† cited by third party

WATER TREATMENT APPARATUS

CROSS-REFERENCE TO RELATED APPLICATIONS

This disclosure claims priority to U.S. Provisional Patent Application No. 62/303,127 filed on Mar. 3, 2016, the disclosure of which is considered part of the disclosure of this application and is hereby incorporated by reference in its entirety.

BACKGROUND

The disclosure relates to a water treatment apparatus for treating stormwater.

Water treatment systems such as storm drains are commonly used to drain excess rain and ground water from impervious surfaces such as roads, pavements, car parks and footpaths. Stormwater planters are also known, and comprise containers located in pavements (sidewalks) having openings for receiving growing media, such as soil, and plants. The organic matter is able to absorb excess rain and ground water, thereby reducing the effects of flash flooding. Further, the organic matter acts as a filter media for filtering pollutants from the stormwater.

However, it is desirable to provide an improved water treatment system for treating stormwater.

SUMMARY

According to an aspect of the disclosure, there is provided a water treatment apparatus for treating stormwater. The water treatment apparatus comprises a volume of filter media, a baffle and an inlet conduit. The baffle extends upwards from the volume of filter media and defines a pre-treatment zone on one side of the baffle and a treatment zone on an opposing side of the baffle. The inlet conduit opens into the pre-treatment zone and is separated from the treatment zone by the baffle. The baffle is configured to regulate a flow of stormwater received via the inlet conduit by controlling the passage of stormwater from the pre-treatment zone to the treatment zone.

The baffle may be arranged such the pre-treatment zone surrounds the treatment zone.

The baffle may comprise a plurality of holes which allow stormwater to pass through the baffle from the pre-treatment zone to the treatment zone.

The plurality of holes may be disposed above an upper surface of the volume of filter media.

The plurality of holes may be spaced upwards from an upper surface of the volume of the filter media.

The baffle may extend into the filter media below an upper surface of the filter media.

The water treatment apparatus may further comprise a structural frame spaced upwards from the filter media with the baffle disposed between the structural frame and the filter media.

The baffle may extend downwards from the structural frame.

The structural frame may comprise a maintenance access hole.

The water treatment apparatus may further comprise a removable cover for removably covering the maintenance access hole.

The maintenance access hole may open into the pre-treatment zone.

The removable cover may comprise an inlet for supplying an external source of the stormwater into the treatment zone and/or pre-treatment zone.

The removable cover may form a surface of a pavement.

The structural frame may comprise an opening for receiving a plant planted in the volume of filter media in the treatment zone.

The inlet conduit may be formed in a curb of a road.

The water treatment apparatus may further comprise a drainage tube at least partly disposed within the volume of filter media. The drainage tube may comprise a plurality of drainage holes for receiving filtered stormwater from the filter media. The drainage tube may comprise a discharge outlet for discharging the filtered stormwater from the drainage tube.

The drainage tube may further comprise a bypass inlet extending above the level of the filter media in the pre-treatment zone for discharging stormwater from the pre-treatment zone and bypassing the treatment zone.

The water treatment apparatus may further comprise an outlet conduit extending from the pre-treatment zone for discharging stormwater from the water treatment apparatus.

The water treatment apparatus may further comprise an auxiliary conduit fluidically connected to the pre-treatment zone for receiving or discharging stormwater into or from the pre-treatment zone.

The inlet conduit, outlet conduit and auxiliary conduit may be provided on different sides of the apparatus.

According to another aspect of the disclosure, there is also provided a water treatment system comprising a plurality of water treatment apparatus as described above, wherein the water treatment apparatus are connected in series such that the outlet conduit of one water treatment apparatus is connected to the inlet conduit of an adjacent water treatment apparatus.

The invention may comprise any combination of the features and/or limitations referred to herein, except combinations of such features that are mutually exclusive.

BRIEF DESCRIPTION OF THE DRAWINGS

Arrangements will now be described, by way of example, with reference to the accompanying drawings, in which.

DETAILED DESCRIPTION

Figure 1:
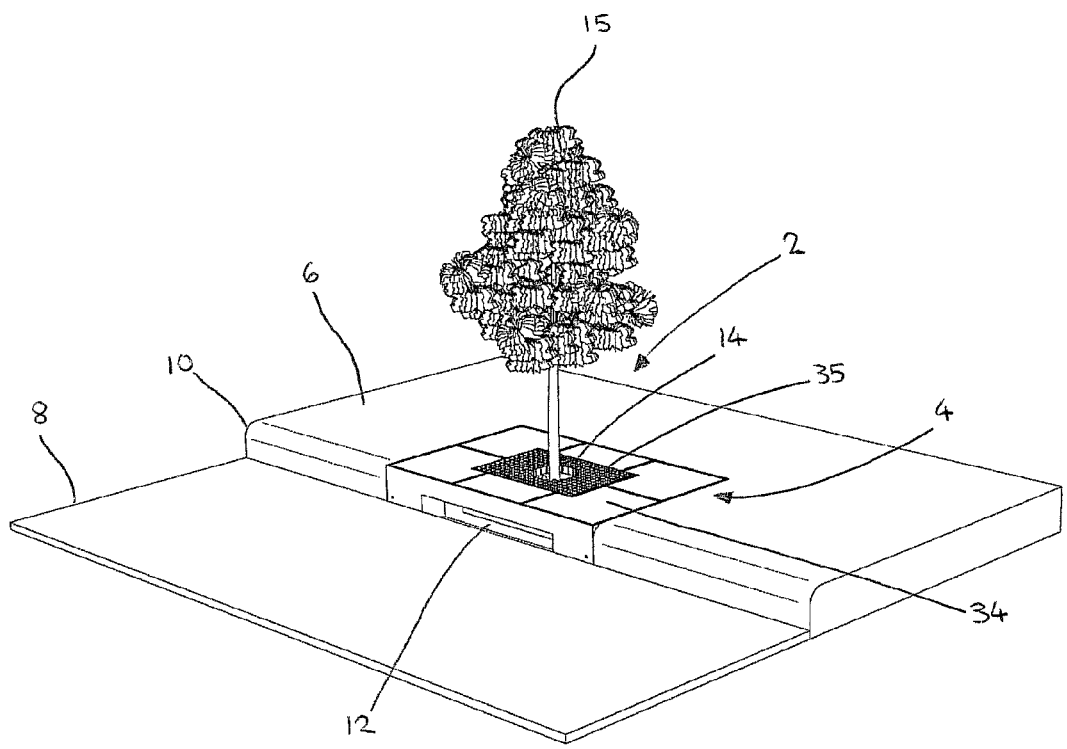
FIG. 1 is a perspective view of a water treatment apparatus.

FIG. 1 shows a water treatment apparatus 2 for treating stormwater. The water treatment apparatus 2 generally comprises a water treatment portion 4 and filter media (not visible in FIG. 1). The water treatment portion 4 is installed in a pavement 6, such that an upper surface of the water treatment portion 4 is level with and forms part of a pavement surface. In the arrangement shown, the water treatment portion 4 is installed next to a road 8, such that a side surface of the water treatment portion 4 forms part of a curb 10.

The side surface of the water treatment portion 4 comprises an inlet conduit 12 for receiving stormwater collected on the upper surface of the road 8. The inlet conduit 12 tapers laterally along its length such that its width reduces. The inlet conduit 12 is therefore funnel-shaped. The lower edge of the inlet conduit 12 is approximately level with the upper surface of the road 8 such that even under low flow conditions, stormwater is able to enter the water treatment portion 4 via the inlet conduit 12.

The upper surface of the water treatment portion 4 is provided with an opening 14 providing access to the filter media below. The filter media is a particulate medium for plant growth. The filter media may comprise a mixture of sand, gravel and organic material and may comprise a top layer of mulch. The filter media (growing media) can be used to grow plants. For example, a tree 15 may grow from the filter media and extend through the opening 14 into the space above the water treatment portion 4.

Figure 2:
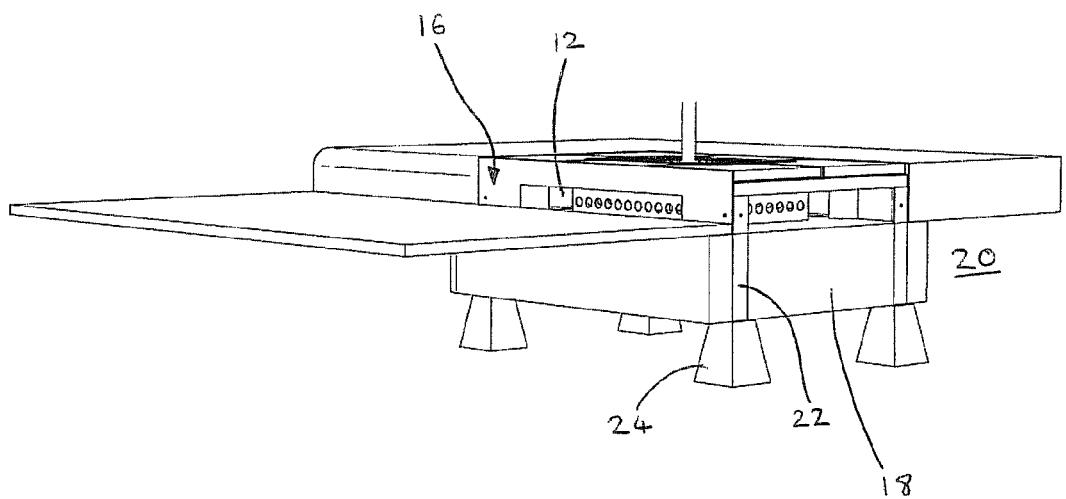
FIG. 2 is a side perspective view showing a cross-section of the water treatment apparatus.

FIG. 2 shows a cross-sectional side view of the water treatment apparatus 2. The water treatment portion 4 comprises a frame 16 disposed approximately at the level of the pavement 6.

A volume of the filter media 18 is disposed below the frame 16. The upper surface of the volume of filter media 18 is provided at a level which is below that of the lower edge of the inlet conduit 12. The volume of filter media 18 is surrounded by the native soil 20 at its sides and base. The filter media 18 directly contacts the native soils 20, which are themselves permeable. As such, stormwater passing through the filter media 18 is able to permeate into the native soils 20.

The frame 16 has a rectangular upper portion. A pillar or pier 22 extends from each of the four corners of the rectangular upper portion. The distal end of each pillar 22 is supported by a concrete pad foundation 24, which is disposed in the native soil 20, below the filter media 18.

Figure 3:
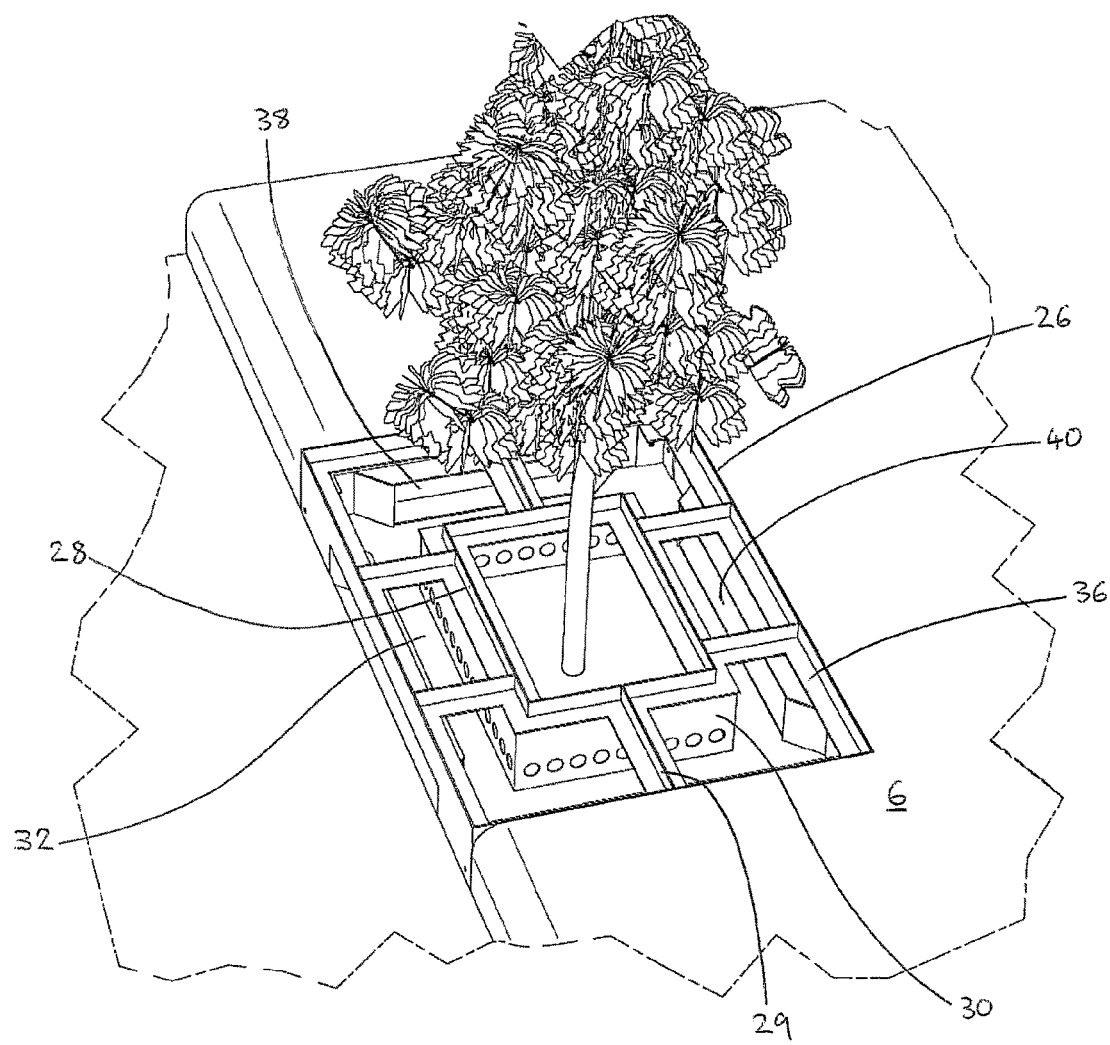
FIG. 3 is a top perspective view showing a further cross-section of the water treatment apparatus.

FIG. 3 shows a further cross-sectional view of the water treatment apparatus 2, as viewed from above. As shown, the upper portion of the frame 16, is formed by an outer rectangular section 26 and an inner rectangular section 28. The inner rectangular section 28 is nested within the outer rectangular section 26 such that they are arranged concentrically. The inner and outer rectangular sections 26, 28 are connected by a plurality of support beams 29, which extend between the outer section 26 and the inner section 28. A rectangular baffle 30 extends downwards from the inner rectangular section 28 of the frame 16 to (and possibly below) the upper surface of the filter media 18.

The support beams 29 divide the area between the outer and inner rectangular sections 26, 28 into a plurality of maintenance access holes 32. As shown in FIGS. 1 and 2, a removable maintenance cover 34 is provided over each of the maintenance access holes 32. The outer rectangular section 26, the inner rectangular section 28 and the support beams 29 comprise support ledges 36, which support the maintenance covers 34 at the level of the upper surface of the pavement 6. The maintenance covers 34 are sufficiently strong that they can be walked on, and thus form an extension of the surface of the pavement 6.

A central opening formed within the inner rectangular section 28 receives a grate 35 in which the opening 14 described previously is formed. The grate 35 allows stormwater collected on the upper surface of the pavement 6 to pass directly into the water treatment portion 4.

As shown, the inlet conduit 12 is provided in one side of the frame 16. Two further openings 38, 40 are provided in two of the other sides of the frame 16, the purpose of which will be described below.

Figure 4:
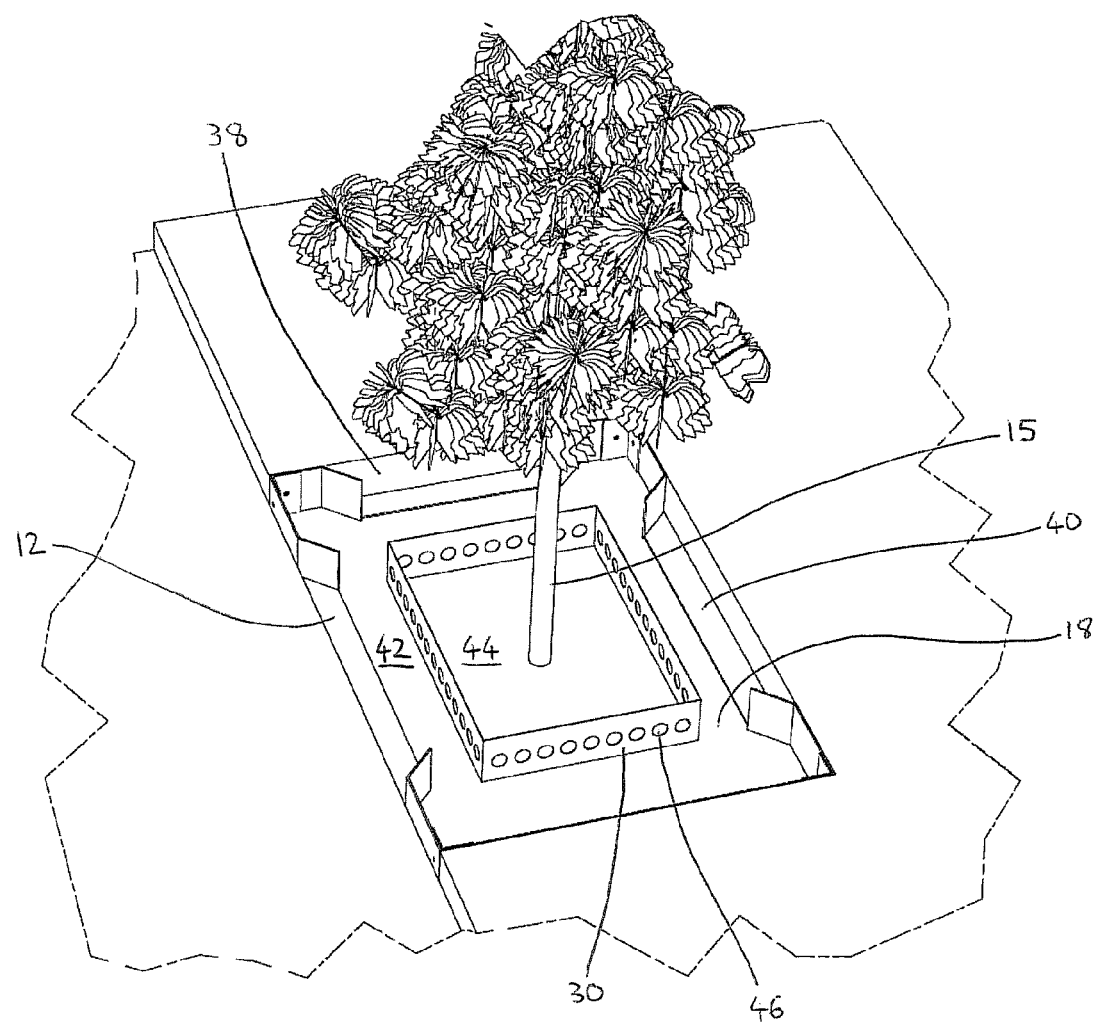
FIG. 4 is a top perspective view showing a further cross-section of the water treatment apparatus.

FIG. 4 shows a further cross-sectional view of the water treatment apparatus 2 as viewed from above. As shown, the rectangular baffle 30 divides a space above the filter media 18 into a pre-treatment zone 42 outside of the baffle 30 and a treatment zone 44 within the baffle 30. The pre-treatment zone 42 surrounds the treatment zone 44.

The baffle 30 comprises a plurality of orifices 46, which extend through the baffle 30. The orifices 46 are circular and are provided in all four sides of the baffle 30. The orifices 46 are of a uniform profile and size. The orifices 46 are equally spaced from each other, and spaced an equal distance from the upper surface of the filter media 18. The lower edges of the orifices 46 are disposed above the upper surface of the filter media 18.

In use, after a period of rainfall, stormwater collected on the road 8 passes through the inlet conduit 12, into the water treatment portion 4. The stormwater initially enters the pre-treatment zone 42. The baffle 30 prevents stormwater from passing through into the treatment zone 44 from the pre-treatment zone 42, such that the stormwater pools within the pre-treatment zone 42.

The filter media 18 is permeable, and, accordingly, the stormwater contained in the pre-treatment zone 42 percolates downwards through the filter media 18. The stormwater contains small particles of solid material, for example small particles of organic matter and grit, that are able to penetrate into the filter media 18. As these small particles pass through the filter media 18, they are retained by the filter media 18 such that the stormwater is filtered. The stormwater entering the water treatment portion 4 also contains larger pieces of solid material such as litter that are unable to penetrate into the filter media 18 and thus collect above the filter media 18 in the pre-treatment zone 42.

Under very low flow conditions, the stormwater is adequately drained via the filter media 18 such that the level in the pre-treatment zone 42 does not rise above the lower edge of the orifices 46 of the baffle 30. Accordingly, the stormwater is unable to pass into the treatment zone 44. Under higher flow conditions, stormwater accumulates in the pre-treatment zone 42 to such a level that it is able to pass from the pre-treatment zone 42, into the treatment zone 44 via the orifices 46. As the orifices 46 are equally spaced from each other, and spaced an equal distance from the upper surface of the filter media 18, the flow of stormwater into the treatment zone 44 is approximately equal around the entire perimeter of the baffle 30 for any given flow condition.

The orifices 46 may also perform a screening function by preventing debris which cannot pass through the orifices 46 from entering the treatment zone 44.

Under high flow conditions, stormwater enters the pre-treatment zone 42 through the inlet conduit 12 at a high velocity. Typically, this would result in the stormwater scouring away a top layer of the filter media 18 and/or causing channeling of the filter media 18. The baffle 30 impedes the flow of the stormwater as it enters the pre-treatment zone 42. This not only reduces the speed of the stormwater and thus the problems described above, it also helps to distribute the stormwater evenly around the entire pre-treatment zone 42, and thus the treatment zone 44. This leads to improved filtration, and increased length of service between maintenance events. Further, the baffle 30 acts to reduce the lateral rate of flow through the treatment zone 44, thereby protecting the plant 15 located therein.

As shown in FIG. 3 and as previously described, the maintenance covers 34 are removable from the maintenance access holes 32. The grate 35 can also be removed. Accordingly, maintenance personnel are able to access both the pre-treatment zone 42 and the treatment zone 44 for removal of solid material that has collected on the upper surface of the filter media 18. Some or all of the filter media 18 may also be replaced, if necessary. These processes may be carried out either manually or using a machine such as a vacuum pump. Once the maintenance process has been completed, the maintenance covers 34 can be replaced.

The baffle 30 may reduce the amount of solid matter that collects in the treatment zone 44 sufficiently such that the grate 35 need not be removable.

Figure 5:
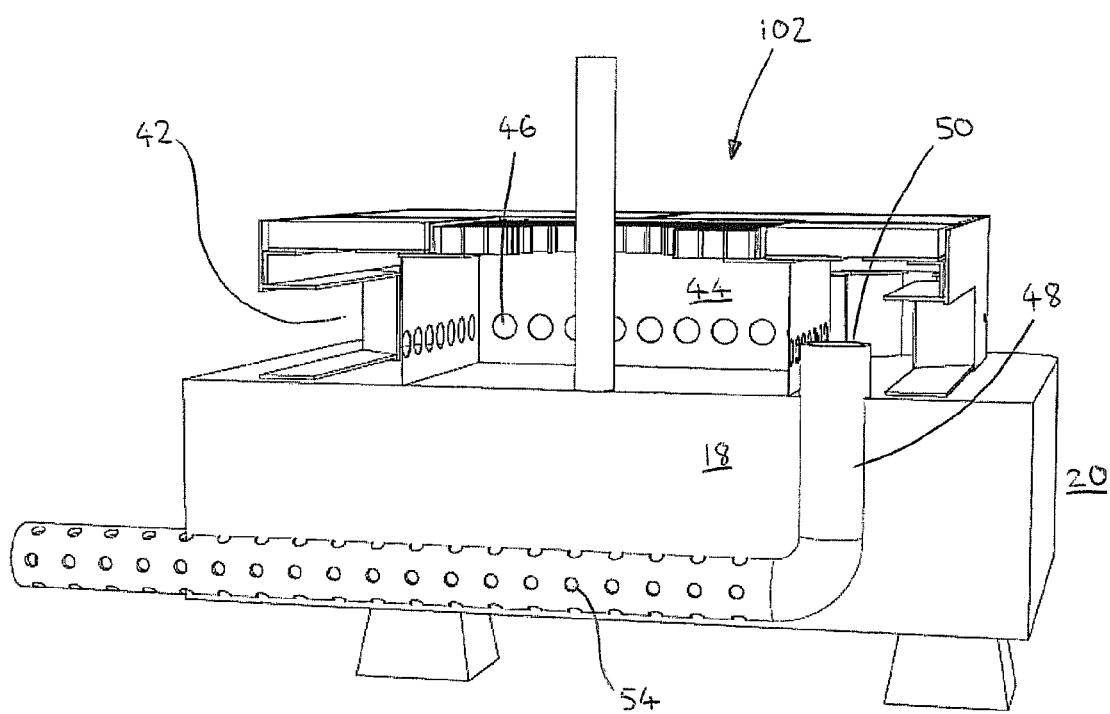
FIG. 5 is a side cross-sectional view of another water treatment apparatus.

FIG. 5 shows another water treatment apparatus 102. The water treatment apparatus 102 of FIG. 5 substantially corresponds to the water treatment apparatus 2 of FIGS. 1 to 4. However, the water treatment apparatus 102 is provided with a drainage tube 48. The drainage tube 48 has a bypass inlet 50 which is located in the pre-treatment zone 42. The drainage tube 48 extends from the bypass inlet 50 into the filter media 18. The section of the drainage tube 48 within the filter media 18 comprises a plurality of drainage holes 54 for receiving filtered stormwater from the filter media 18. Under high flow conditions, for example where the rate of absorption of stormwater into the surrounding native soils 20 is less than the rate of stormwater being produced by the filter media 18, the drainage tube 48 is able to convey filtered stormwater away from the filter media 18. Further, when stormwater pools above the surface of the filter media 18 in the pre-treatment zone 42, the drainage tube 48 acts as an overflow device. Specifically, once stormwater in the pre-treatment zone 42 reaches the level of the bypass inlet 50, it passes directly into the drainage tube 48, thereby bypassing the treatment zone 44 and the saturated filter media 18. The bypass inlet 50 is positioned above the lower edge of the orifices 46. Accordingly, it is only possible for stormwater to bypass the filter media 18 if stormwater is already being filtered by the filter media 18 contained in both the pre-treatment zone 42 and the treatment zone 44.

Figure 6:
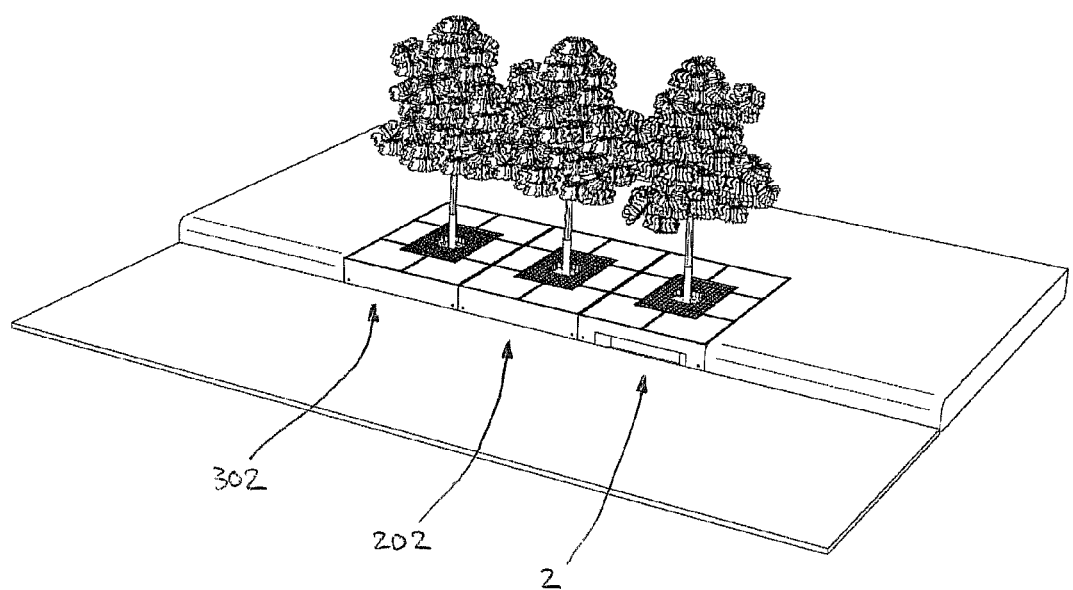
FIG. 6 is a perspective view showing a water treatment system comprising a plurality of water treatment apparatus.

FIG. 6 shows a water treatment system comprising a plurality of water treatment apparatus as described previously. In the example shown, three water treatment apparatus 2, 202, 302 are joined in series to form a modular array, however any number of apparatus may be used. As previously mentioned with reference to FIG. 3, additional openings 38, 40 may be provided. These openings 38, 40 can be used when forming a modular array as shown.

Figure 7:
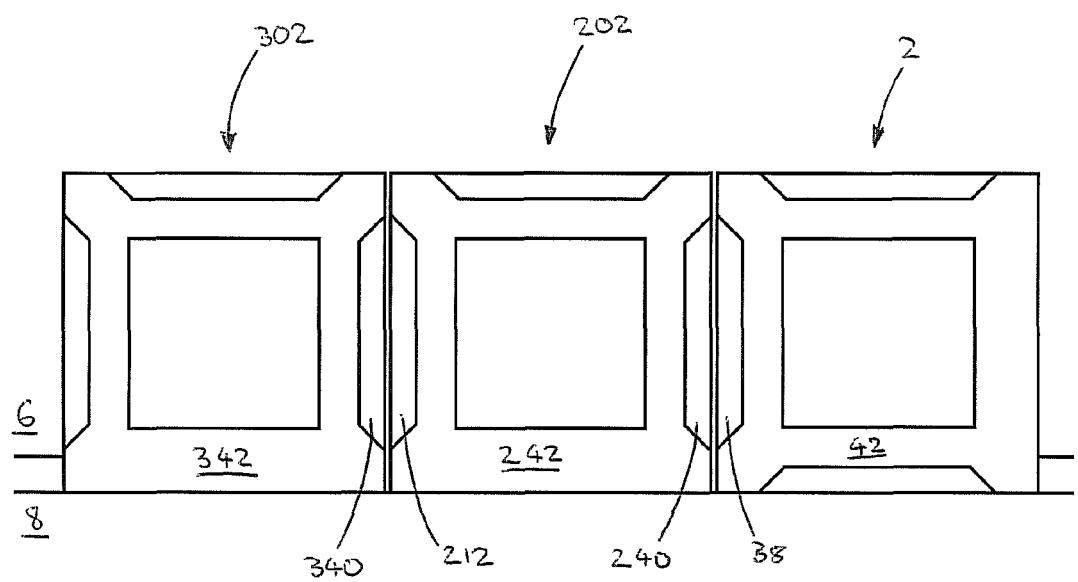
FIG. 7 is a schematic plan view showing a cross-section of the water treatment system of FIG. 6.

As shown in FIG. 7, the opening 38 forms an outlet from the first water treatment apparatus 2 and is disposed adjacent the opening 240 of the second water treatment apparatus 202, which forms an inlet to the second water treatment apparatus 202. Accordingly, stormwater that accumulates in the pre-treatment zone 42 of the first water treatment apparatus 2 is able to pass out of the opening 38 and into the pre-treatment zone 242 of the second water treatment apparatus 202. Similarly, the opening 212 forms an outlet from the second water treatment apparatus 202 and is disposed adjacent the opening 340 of the third water treatment apparatus 302, which forms an inlet. Stormwater that accumulates in the pre-treatment zone 242 of the second water treatment apparatus 202 is therefore able to pass out of the opening 212 and into the pre-treatment zone 342 of the third water treatment apparatus 302.

In this arrangement, the sides of the second and third water treatment apparatus 202, 302 not having openings are disposed adjacent the road 8, such that stormwater from the road 8 has a single point of entry into the water treatment system. In alternative arrangements, the water treatment apparatus 202, 302 may be arranged such that an opening of one or both water treatment apparatus 202, 302 are disposed adjacent the road 8, to provide additional entry points.

The modular arrangement may also be in the form of a matrix of columns and rows of apparatus.

In some arrangements, the baffle 30 may be replaceable. The baffle 30 may be replaced during a maintenance event for a variety of reasons. For example, the orifices 46 may have become blocked to such an extent that in-situ repair is not possible. Accordingly, the baffle 30 may be removed, unblocked, and then reinstalled. A similar process may be carried out for any type of maintenance that needs to be carried out on the baffle 30. Alternately, the baffle 30 may be removed and replaced by a new baffle 30. The new baffle 30 may have a geometry that differs from that of the original baffle 30. For example, the height, spacing, diameter and/or shape of the orifices 46 may differ from those of the original baffle 30. This may allow the characteristics of the apparatus to be customized for the specific installation. Replacement may be carried out seasonally, so as to account for expected changes in local climate throughout the course of the year. The same effect may also be achieved using a baffle 30 which has a geometry that can be adjusted, either in-situ or following a temporary removal of the baffle 30, such that, while the entire baffle 30 is not replaced, it functions as a new baffle 30.

The orifices 46 may differ from those shown and described above. The baffle plate could also act as a weir rather than having discrete orifices. A weir may also be provided in addition to orifices to provide a bypass function during high flow conditions.

Although the baffle 30 has been described as being rectangular, it may be of any shape. In particular, the baffle may be formed as a single wall which extends laterally across the frame 16. Accordingly, the pre-treatment zone 42 may be adjacent the treatment zone 44, but not surround it.

Although it has been described that the filter media 18 directly contacts the surrounding native soils 20, it may instead be housed within a container.

The invention claimed is:

1. A water treatment apparatus for treating stormwater, the water treatment apparatus comprising:
   a volume of filter media;
   a baffle extending upwards from within the borders of the volume of filter media and defining a pre-treatment zone on one side of the baffle and a treatment zone on an opposing side of the baffle; and
   an inlet conduit opening into the pre-treatment zone and separated from the treatment zone by the baffle, wherein the baffle is configured to regulate a flow of stormwater received via the inlet conduit by controlling the passage of stormwater from the pre-treatment zone to the treatment zone, wherein the baffle extends into the filter media below an upper surface of the filter media.

2. The water treatment apparatus as claimed in claim 1, wherein the baffle is arranged such that the pre-treatment zone surrounds the treatment zone.

3. The water treatment apparatus as claimed in claim 1, wherein the baffle includes a plurality of holes which allow stormwater to pass through the baffle from the pre-treatment zone to the treatment zone.

4. The water treatment apparatus as claimed in claim 3, wherein the plurality of holes are disposed above an upper surface of the volume of filter media.

5. The water treatment apparatus as claimed in claim 4, wherein the plurality of holes are spaced upwards from an upper surface of the volume of the filter media.

6. The water treatment apparatus as claimed in claim 1, further including a structural frame spaced upwards from the filter media with the baffle disposed between the structural frame and the filter media.

7. The water treatment apparatus as claimed in claim 6, wherein the baffle extends downwards from the structural frame.

8. The water treatment apparatus as claimed in claim 7, wherein the baffle extends downwards from the structural frame to the volume of the filter media.

9. The water treatment apparatus as claimed in claim 6, wherein the structural frame includes a maintenance access hole.

10. The water treatment apparatus as claimed in claim 9, further including a removable cover for removably covering the maintenance access hole.

11. The water treatment apparatus as claimed in claim 10, wherein the removable cover includes an inlet for supplying an external source of the stormwater into the treatment zone and/or pre-treatment zone.

12. The water treatment apparatus as claimed in claim 10, wherein the removable cover forms a surface of a pavement.

13. The water treatment apparatus as claimed in claim 9, wherein the maintenance access hole opens into the pre-treatment zone.

14. The water treatment apparatus as claimed in claim 6, wherein the structural frame includes an opening for receiving a plant planted in the volume of filter media in the treatment zone.

15. The water treatment apparatus as claimed in claim 1, wherein the inlet conduit is formed in a curb of a road.

16. The water treatment apparatus as claimed in claim 1, further including a drainage tube at least partly disposed within the volume of filter media, wherein the drainage tube includes a plurality of drainage holes for receiving filtered stormwater from the filter media, and a discharge outlet for discharging the filtered stormwater from the drainage tube.

17. The water treatment apparatus as claimed in claim 16, wherein the drainage tube further includes a bypass inlet extending above the level of the filter media in the pre-treatment zone for discharging stormwater from the pre-treatment zone and bypassing the treatment zone.

18. The water treatment apparatus as claimed in claim 1, further including an outlet conduit extending from the pre-treatment zone for discharging stormwater from the water treatment apparatus.

19. The water treatment apparatus as claimed in claim 18, further including an auxiliary conduit fluidically connected to the pre-treatment zone for receiving or discharging stormwater into or from the pre-treatment zone.

20. The water treatment apparatus as claimed in claim 19, wherein the inlet conduit, outlet conduit and auxiliary conduit are provided on different sides of the apparatus.

21. The water treatment system including a plurality of water treatment apparatus as claimed in claim 18, wherein the water treatment apparatus are connected in series such that the outlet conduit of one water treatment apparatus is connected to the inlet conduit of an adjacent water treatment apparatus.

22. A water treatment apparatus for treating stormwater, the water treatment apparatus comprising:
a volume of filter media;
a baffle extending upwards from within the borders of the volume of filter media and defining a pre-treatment zone on one side of the baffle and a treatment zone on an opposing side of the baffle; and
an inlet conduit opening into the pre-treatment zone and separated from the treatment zone by the baffle, wherein the baffle is configured to regulate a flow of stormwater received via the inlet conduit by controlling the passage of stormwater from the pre-treatment zone to the treatment zone; and
a structural frame spaced upwards from the filter media with the baffle supported by the structural frame and disposed between the structural frame and the filter media, wherein the baffle extends downwards from the structural frame to the volume of the filter media.

* * * * *